(12) United States Patent
Iwama

(10) Patent No.: US 12,084,066 B2
(45) Date of Patent: Sep. 10, 2024

(54) VEHICLE CONTROL METHOD AND VEHICLE CONTROL DEVICE

(71) Applicant: TOYOTA JIDOSHA KABUSHIKI KAISHA, Toyota (JP)

(72) Inventor: Masamichi Iwama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 17/954,923

(22) Filed: Sep. 28, 2022

(65) Prior Publication Data
US 2023/0166735 A1    Jun. 1, 2023

(30) Foreign Application Priority Data
Nov. 29, 2021 (JP) ................... 2021-192956

(51) Int. Cl.
*B60W 40/105* (2012.01)
*B60W 30/18* (2012.01)
*B60W 50/06* (2006.01)

(52) U.S. Cl.
CPC .... *B60W 40/105* (2013.01); *B60W 30/18172* (2013.01); *B60W 50/06* (2013.01); *B60W 2300/18* (2013.01); *B60W 2520/105* (2013.01); *B60W 2520/28* (2013.01); *B60W 2520/30* (2013.01)

(58) Field of Classification Search
CPC ............... B60W 40/105; B60W 50/06; B60W 2300/18; B60W 2510/10; B60W 2510/105; B60W 2520/105; B60W 2520/28; B60W 2520/30
See application file for complete search history.

(56) References Cited

U.S. PATENT DOCUMENTS

| | | | |
|---|---|---|---|
| 5,132,907 A | 7/1992 | Ishikawa | |
| 11,287,439 B2 * | 3/2022 | Oh | ................. G01P 3/481 |
| 11,292,308 B2 * | 4/2022 | Nasu | .............. B60W 40/11 |

FOREIGN PATENT DOCUMENTS

JP          01-101260 A    4/1989

* cited by examiner

*Primary Examiner* — Hung Q Nguyen
*Assistant Examiner* — Mark L. Greene
(74) *Attorney, Agent, or Firm* — Sughrue Mion, PLLC

(57) ABSTRACT

A vehicle control method includes: acquiring information on acceleration, information on rotational speed of a drive wheel, and information on driving force; after a dropping state where a calculated speed indicative of a vehicle body speed calculated from the rotational speed is less than an estimated speed indicative of a vehicle body speed in a front-rear direction estimated from the acceleration has transitioned to a non-dropping state and a holding period in which the non-dropping state is held has passed, determining whether or not a reset condition to reset the estimated speed is satisfied; when the reset condition is satisfied, determining whether or not the driving force is less than a threshold value; and when the driving force is less than the threshold value, resetting the estimated speed and setting a current value of the calculated speed to a vehicle body initial speed used for estimating the estimated speed.

4 Claims, 8 Drawing Sheets

FIG. 7
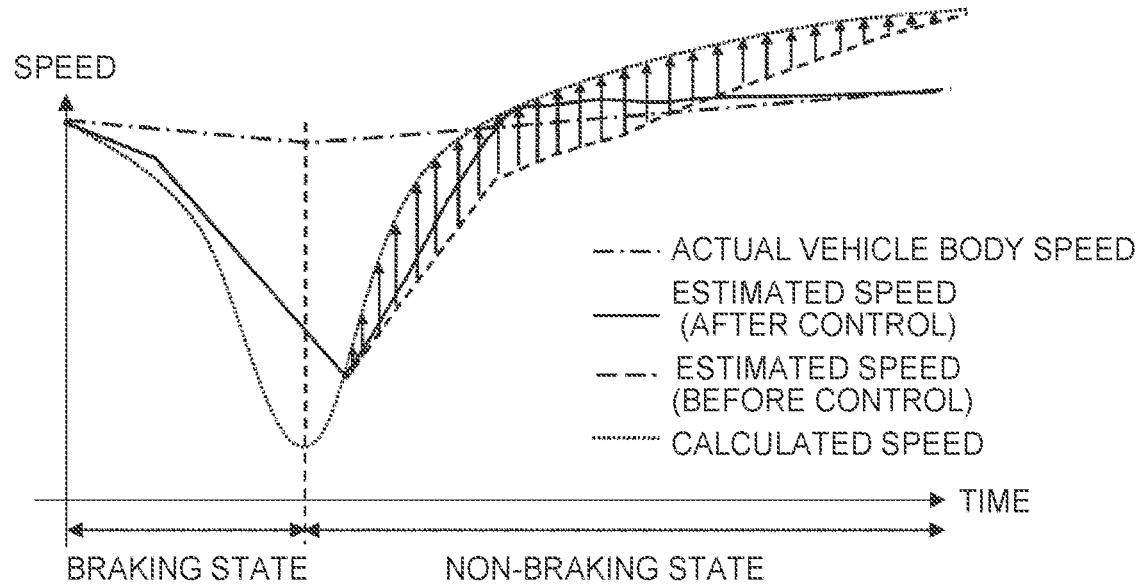
< ACCELERATION SLIP STATE IN ESTIMATED SPEED (BEFORE CONTROL) >
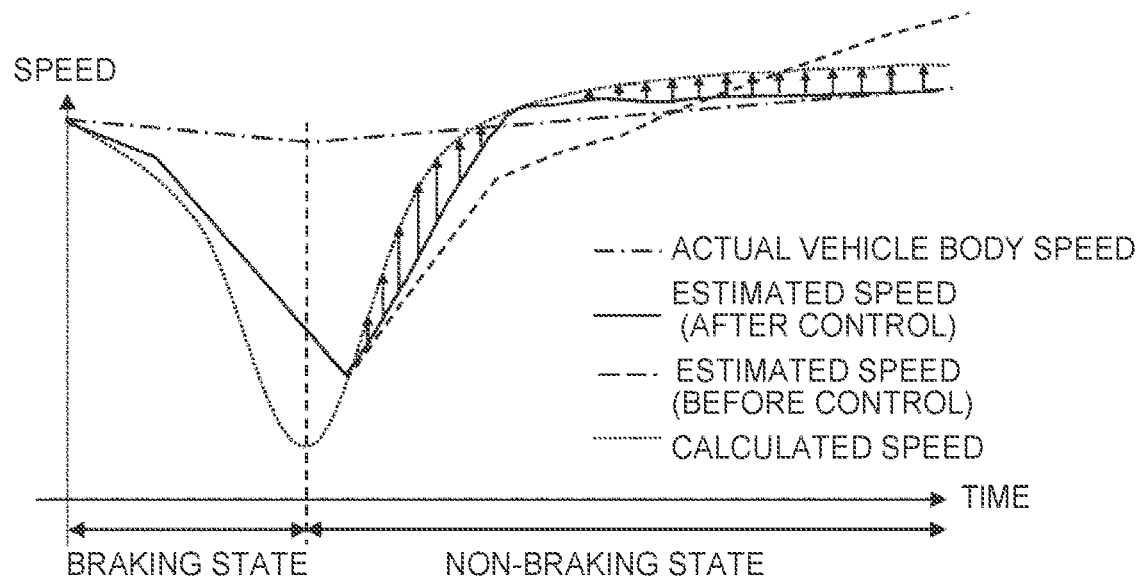
< ACCELERATION SLIP STATE IN ESTIMATED SPEED (AFTER CONTROL) >

FIG. 8
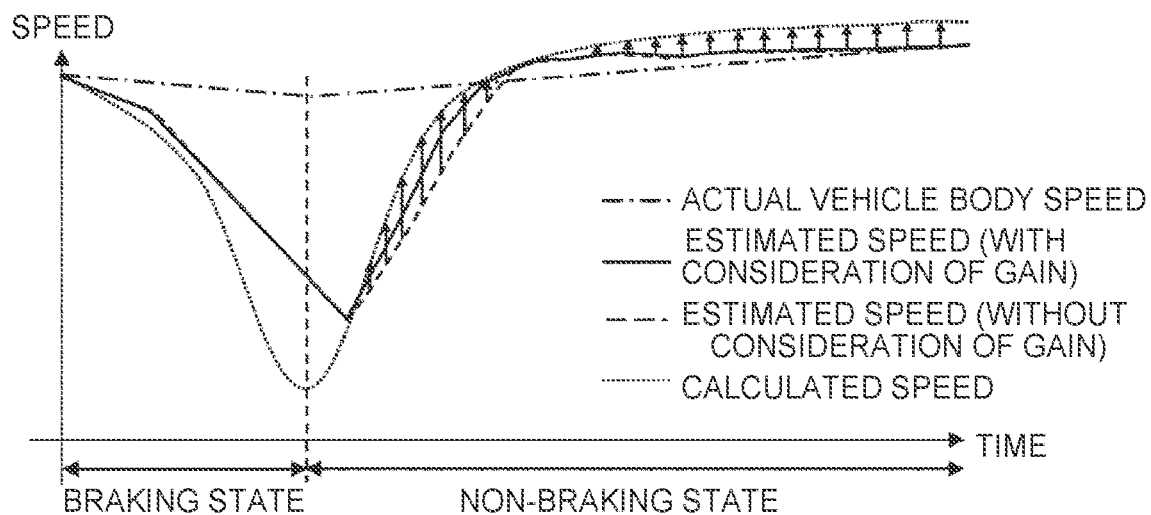
< ACCELERATION SLIP STATE IN ESTIMATED SPEED
(WITHOUT CONSIDERATION OF GAIN) >
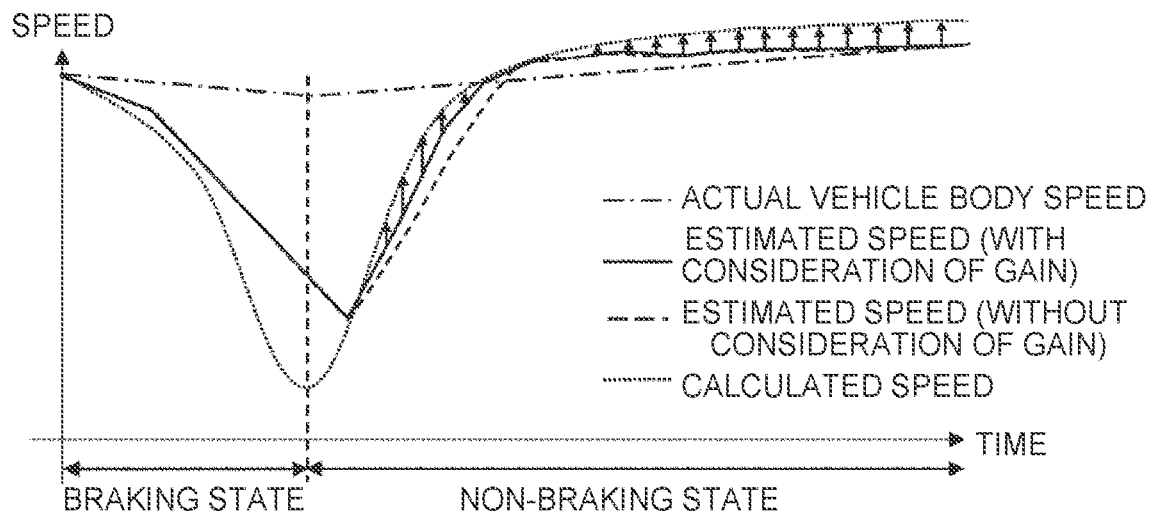
< ACCELERATION SLIP STATE IN ESTIMATED SPEED
(WITH CONSIDERATION OF GAIN) >

VEHICLE CONTROL METHOD AND VEHICLE CONTROL DEVICE

CROSS-REFERENCE TO RELATED APPLICATION

This application claims priority to Japanese Patent Application No. 2021-192956 filed on Nov. 29, 2021, incorporated herein by reference in its entirety.

BACKGROUND

1. Technical Field

The present disclosure relates to a technique of suppressing an acceleration slip of a four-wheel drive vehicle.

2. Description of Related Art

Japanese Unexamined Patent Application Publication No. 01-101260 (JP 01-101260 A) discloses a technique in which, in a wheel slip prevention control device, an acceleration acquired from an acceleration sensor is offset by a certain amount as a sensor error, and a vehicle body speed is estimated by the integration of the acceleration. In this technique, in an acceleration slip state where the estimated speed estimated by the integration of the acceleration is less than a calculated speed calculated from rotational speeds of drive wheels during non-braking, the estimated speed is reset to the calculated speed.

SUMMARY

By resetting the estimated speed to the calculated speed in the acceleration slip state, an acceleration slip amount indicative of a difference between the estimated speed and the calculated speed decreases. Consequently, it is possible to suppress the intervention of a traction control system (TRC) that operates when the acceleration slip amount is equal to or greater than a predetermined threshold value in the acceleration slip state, so that it is possible to prevent excessive suppression of driving force. In a two-wheel drive vehicle, even when the intervention of the TRC is suppressed, since the estimated speed transitions to the actual vehicle body speed of idler wheels, it is possible to ensure the running safety of the vehicle.

However, in a four-wheel drive vehicle, since driving force is distributed to all four wheels, it is not possible to grasp whether or not the estimated speed transitions to the actual vehicle body speed. Therefore, when the intervention of the TRC is suppressed, there is a possibility of the occurrence of an actual slip state where the estimated speed exceeds the actual vehicle body speed, leading to a possibility that the running safety of the vehicle cannot be ensured. In this case, it is desirable not to reset the estimated speed to the calculated speed, but, in the acceleration slip state, all the four wheels are in a state where an acceleration slip occurs, and therefore, the control amount by the intervention of the TRC becomes excessive, resulting in poor acceleration. Therefore, in the four-wheel drive vehicle, improvement is desired such that the estimated speed is properly controlled at the proper timing to execute control of the acceleration slip amount in the acceleration slip state.

It is an object of the present disclosure to provide a technique that can properly control an acceleration slip amount when a four-wheel drive vehicle is determined to be in an acceleration slip state.

A first aspect of the present disclosure relates to a vehicle control method. The vehicle control method acquires information on acceleration from an acceleration sensor of a four-wheel drive vehicle, information on rotational speed of a drive wheel from a wheel speed sensor of the vehicle, and information on driving force to the drive wheel. After a dropping state where a calculated speed indicative of a vehicle body speed calculated from the rotational speed is less than an estimated speed indicative of a vehicle body speed in a front-rear direction estimated from the acceleration has transitioned to a non-dropping state and a holding period in which the non-dropping state is held has passed, the vehicle control method determines whether or not a reset condition to reset the estimated speed is satisfied. When the reset condition is determined to be satisfied, the vehicle control method determines whether or not the driving force is less than a threshold value. When the driving force is determined to be less than the threshold value, the vehicle control method resets the estimated speed and sets a current value of the calculated speed to a vehicle body initial speed used for estimating the estimated speed.

In a second aspect of the present disclosure according to the first aspect, the estimated speed obtained by setting the current value of the calculated speed to the vehicle body initial speed may further be multiplied by a gain.

In a third aspect of the present disclosure according to the first or second aspect, the reset condition may include that the estimated speed is in the non-dropping state and that the drive wheel is not in a braking state.

In a fourth aspect of the present disclosure according to any one of the first to third aspects, when the reset condition is determined to be satisfied, the vehicle control method may set an execution period indicative of a period following the holding period and indicative of a period in which the setting of the vehicle body initial speed is executed.

In a fifth aspect of the present disclosure according to any one of the first to fourth aspects, a step of determining the dropping state may include: determining whether or not the drive wheel is in a braking state and whether or not a state where the calculated speed is less than the estimated speed has continued for a predetermined period or more; and when it is determined that the drive wheel is in the braking state and that the state where the calculated speed is less than the estimated speed has continued for the predetermined period or more, determining that the estimated speed is in the dropping state.

A sixth aspect of the present disclosure relates to a vehicle control device. The vehicle control device includes a storage device and a processor. The storage device stores information on acceleration from an acceleration sensor of a four-wheel drive vehicle, information on rotational speed of a drive wheel from a wheel speed sensor of the vehicle, and information on driving force to the drive wheel. The processor is configured to execute a step of suppressing an acceleration slip of the vehicle. The step of suppressing the acceleration slip includes: after a dropping state where a calculated speed indicative of a vehicle body speed calculated from the rotational speed is less than an estimated speed indicative of a vehicle body speed in a front-rear direction estimated from the acceleration has transitioned to a non-dropping state and a holding period in which the non-dropping state is held has passed, determining whether or not a reset condition to reset the estimated speed is satisfied; when the reset condition is determined to be satisfied, determining whether or not the driving force is less than a threshold value; and when the driving force is determined to be less than the threshold value, resetting the estimated speed and setting a current value of the calculated speed to a vehicle body initial speed used for estimating the estimated speed.

In a seventh aspect of the present disclosure according to the sixth aspect, the estimated speed obtained by setting the current value of the calculated speed to the vehicle body initial speed may further be multiplied by a gain.

In an eighth aspect of the present disclosure according to the sixth or seventh aspect, the reset condition may include that the estimated speed is in the non-dropping state and that the drive wheel is not in a braking state.

In a ninth aspect of the present disclosure according to any one of the sixth to eighth aspects, when the reset condition is determined to be satisfied, the vehicle control device may set an execution period indicative of a period following the holding period and indicative of a period in which the setting of the vehicle body initial speed is executed.

In a tenth aspect of the present disclosure according to any one of the sixth to ninth aspects, a step of determining the dropping state may include: determining whether or not the drive wheel is in a braking state and whether or not a state where the calculated speed is less than the estimated speed has continued for a predetermined period or more; and when it is determined that the drive wheel is in the braking state and that the state where the calculated speed is less than the estimated speed has continued for the predetermined period or more, determining that the estimated speed is in the dropping state.

According to the first aspect, after the estimated speed estimated from the acceleration of the vehicle in its front-rear direction has transitioned from the dropping state to the non-dropping state and further the period in which the non-dropping state is held has passed, it is determined whether or not the reset condition is satisfied. When the reset condition is determined to be satisfied, it is determined whether or not the driving force of the drive wheel is less than the threshold value. Then, when the driving force is determined to be less than the threshold value, the current value of the estimated speed is reset. Further, the current value of the calculated speed calculated from the rotational speed of the drive wheel is set to the vehicle body initial speed used for estimating the estimated speed. Through the series of processes, when the four-wheel drive vehicle is in an acceleration slip state, the estimated speed at the timing to start control of an acceleration slip amount can be set to a proper value, and therefore, it is possible to properly control the acceleration slip amount.

According to the second aspect, it is possible to properly control the acceleration slip amount by the estimated speed multiplied by the gain.

According to the third aspect, it is possible to properly determine the timing to start control of the acceleration slip amount.

According to the fourth aspect, in the execution period, it is possible to reset the current value of the estimated speed and set the vehicle body initial speed used for estimating the estimated speed.

According to the fifth aspect, it is possible to properly determine that the four-wheel drive vehicle is in the acceleration slip state.

According to the sixth aspect, it is possible to obtain the same effect as that of the first aspect.

According to the seventh aspect, it is possible to obtain the same effect as that of the second aspect.

According to the eighth aspect, it is possible to obtain the same effect as that of the third aspect.

According to the ninth aspect, it is possible to obtain the same effect as that of the fourth aspect.

According to the tenth aspect, it is possible to obtain the same effect as that of the fifth aspect.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram illustrating an example of the processing result in the acceleration slip suppression processing unit of the vehicle control device according to the embodiment of the present disclosure; and FIG. 8 is a diagram illustrating an example of the processing result in the acceleration slip suppression processing unit of the vehicle control device according to the embodiment of the present disclosure.

DETAILED DESCRIPTION OF EMBODIMENTS

A vehicle control method and a vehicle control device according to an embodiment of the present disclosure will be described with reference to the accompanying drawings. The vehicle control method according to the embodiment is realized by the computer processing of the vehicle control device according to the embodiment.

1. Embodiment 1-1. Configuration Example

A vehicle control device 10 according to this embodiment is a device that, for suppressing an acceleration slip of a four-wheel drive vehicle (hereinafter also simply referred to as a "vehicle"), determines a state of driving force to the drive wheels of the vehicle in a predetermined period of an acceleration slip state and controls an estimated speed based on the result of the determination. The vehicle control device 10 according to this embodiment is installed in the vehicle.

Figure 1:
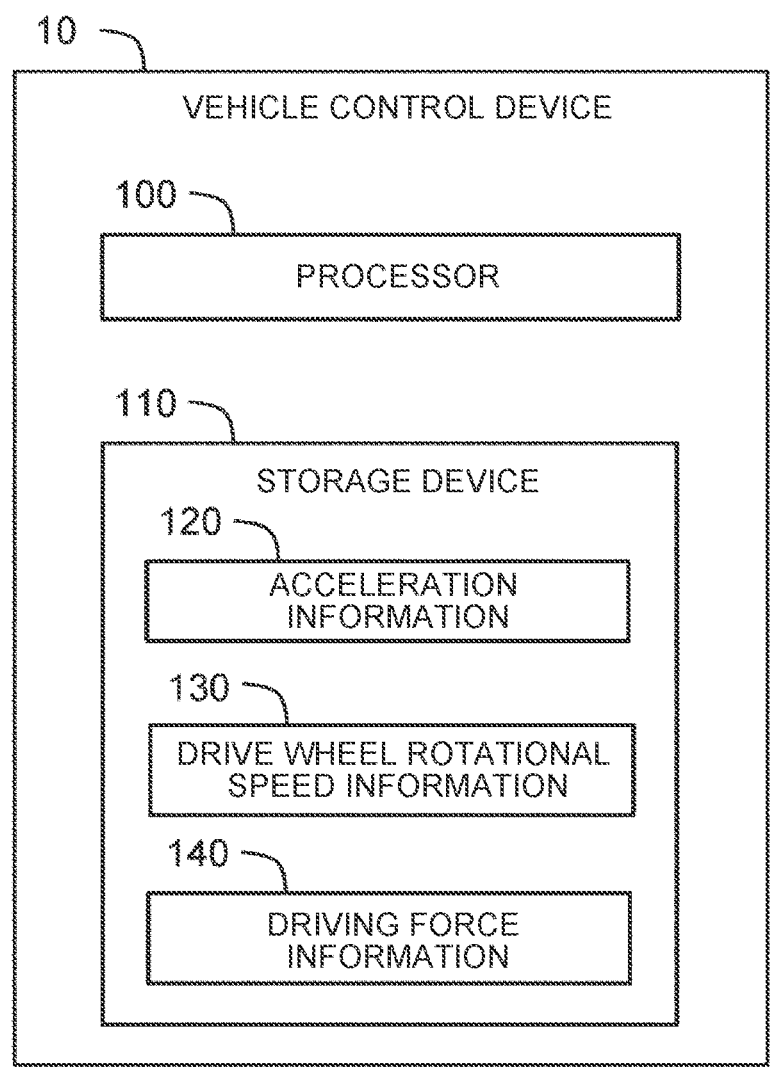
FIG. 1 is a block diagram illustrating a configuration example of a vehicle control device according to an embodiment of the present disclosure.

FIG. 1 is a block diagram illustrating a configuration example of the vehicle control device 10 according to this embodiment.

The vehicle control device 10 executes various information processing. The vehicle control device 10 includes one or a plurality of processors 100 (hereinafter simply referred to as the processor 100) and one or a plurality of storage devices 110 (hereinafter simply referred to as the storage device 110). The processor 100 executes various processes. For example, the processor 100 may be a CPU or the like. The storage device 110 stores data of acceleration information 120, data of drive wheel rotational speed information 130, and data of driving force information 140. For example, the storage device 110 may be a volatile memory, a non-volatile memory, an HDD, an SSD, or the like. Functions of the vehicle control device 10 are realized by the execution of a vehicle control program being a computer program by the processor 100. The vehicle control program is stored in the storage device 110. The vehicle control program may be stored in a computer readable storage medium. The vehicle control program may be provided via a network.

The acceleration information 120 includes information on acceleration of the vehicle in its front-rear direction acquired from an acceleration sensor installed in the vehicle. The drive wheel rotational speed information 130 includes information on rotational speeds of the drive wheels of the vehicle acquired from wheel speed sensors respectively mounted on all the drive wheels. The driving force information 140 includes information on driving force to all the drive wheels acquired from a drive device installed in the vehicle.

1-2. Details of Information Processing

The vehicle control device 10 estimates a state of vehicle body speed based on the acceleration information 120 and the drive wheel rotational speed information 130. Thereafter, according to the estimated state of the estimated speed, the vehicle control device 10 sets a predetermined period in which it is possible to control the estimated speed. Further, the vehicle control device 10 determines a state of driving force in the predetermined period based on the driving force information 140 and executes control to set the estimated speed to a proper speed based on the result of the determination, thereby executing acceleration slip suppression processing to suppress an acceleration slip. The information processing according to this embodiment includes characteristic processes as will be described below.

Figure 2:
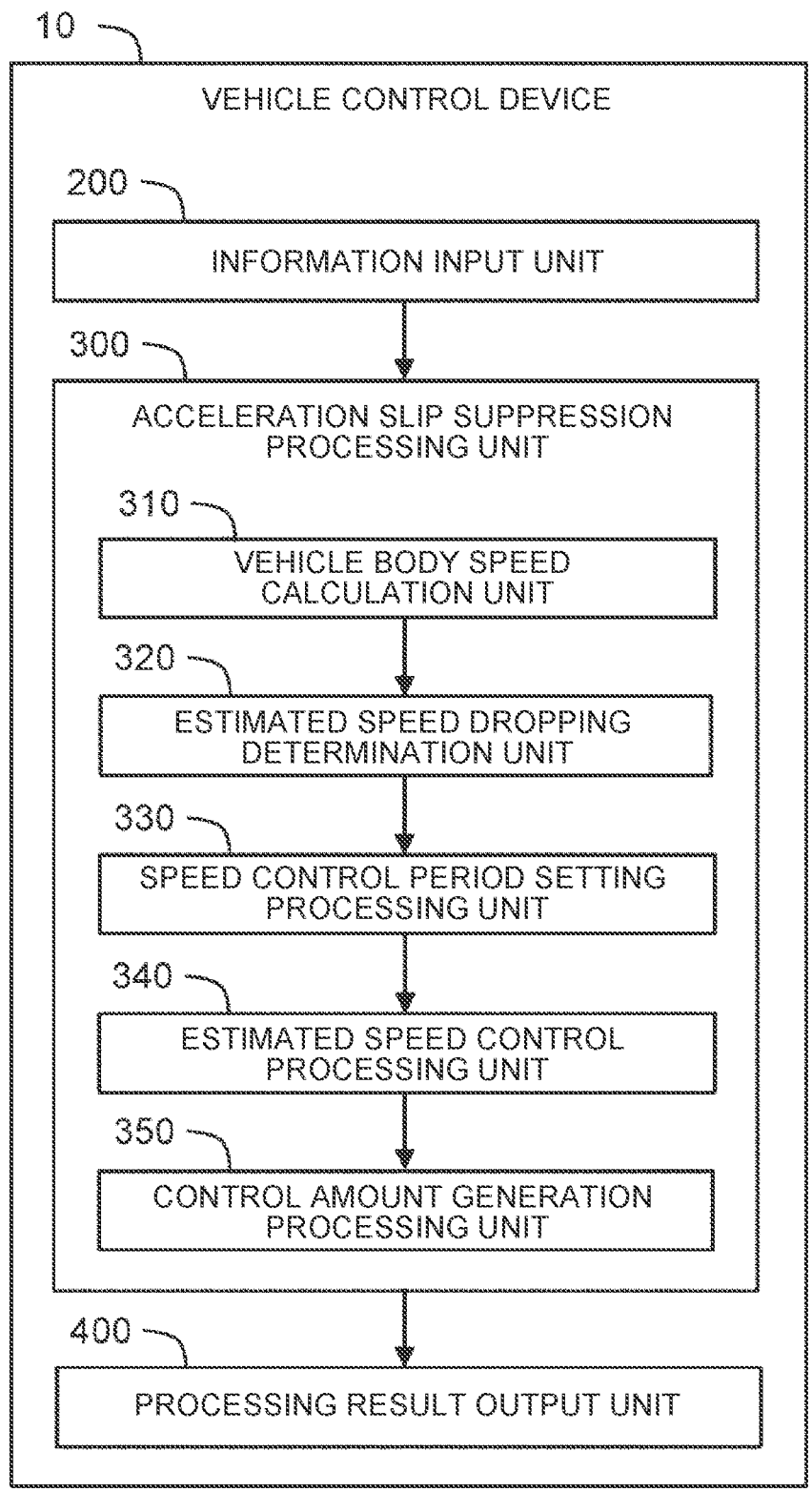
FIG. 2 is a block diagram illustrating a functional example of the vehicle control device according to the embodiment of the present disclosure.

FIG. 2 is a block diagram illustrating a functional example relating to the information processing according to this embodiment. The vehicle control device 10 includes, as functional blocks, an information input unit 200, an acceleration slip suppression processing unit 300, and a processing result output unit 400. These functional blocks are realized by the execution of the vehicle control program by the processor 100.

The information input unit 200 executes a process of inputting the acceleration information 120, the drive wheel rotational speed information 130, and the driving force information 140 stored in the storage device 110. Thereafter, the information input unit 200 outputs the input acceleration information 120, drive wheel rotational speed information 130, and driving force information 140 to the acceleration slip suppression processing unit 300.

The acceleration slip suppression processing unit 300 includes a vehicle body speed calculation unit 310, an estimated speed dropping determination unit 320, a speed control period setting processing unit 330, an estimated speed control processing unit 340, and a control amount generation processing unit 350. Based on the input acceleration information 120, drive wheel rotational speed information 130, and driving force information 140, the acceleration slip suppression processing unit 300 determines whether or not the occurrence of an acceleration slip is signified. When it is determined that the occurrence of the acceleration slip is signified, the acceleration slip suppression processing unit 300 sets a predetermined period in which it is possible to control the estimated speed, and determines a state of driving force in the predetermined period. According to the result of the determination, the acceleration slip suppression processing unit 300 controls the estimated speed to a speed that can suppress the acceleration slip. The details of the processes of the vehicle body speed calculation unit 310, the estimated speed dropping determination unit 320, the speed control period setting processing unit 330, the estimated speed control processing unit 340, and the control amount generation processing unit 350 will be described below.

The vehicle body speed calculation unit 310 calculates an estimated speed indicative of a vehicle body speed, that is estimated by adding to a vehicle body speed an integrated value obtained by integrating the input acceleration information 120. Further, based on the input drive wheel rotational speed information 130, the vehicle body speed calculation unit 310 calculates a calculated speed indicative of a vehicle body speed.

Based on the estimated speed and the calculated speed calculated by the vehicle body speed calculation unit 310, the estimated speed dropping determination unit 320 determines whether or not the estimated speed is in a "dropping state". When it is determined that the estimated speed is in the "dropping state", it is determined that the occurrence of an acceleration slip is signified. The details of the process of the estimated speed dropping determination unit 320 will be described later.

When it is determined that the estimated speed is in the "dropping state" by the estimated speed dropping determination unit 320, then after the estimated speed has transitioned from the "dropping state" to a "non-dropping state" and a holding period in which the "non-dropping state" is held has passed, the speed control period setting processing unit 330 determines whether or not a reset condition is satisfied. When it is determined that the reset condition is satisfied, the speed control period setting processing unit 330 sets an execution period in which it is possible to control the estimated speed.

The reset condition is a condition including that, after the estimated speed has transitioned from the "dropping state" to the "non-dropping state" and then the "non-dropping state" has continued for the holding period, the estimated speed is in the "non-dropping state" and further the drive wheels are not in a braking state. The details of the process of the speed control period setting processing unit 330 will be described later.

In the execution period set by the speed control period setting processing unit 330, based on a state of driving force, the estimated speed control processing unit 340 executes control to reset a current value of the estimated speed and set a current value of the calculated speed to a vehicle body initial speed used for estimating the estimated speed. The details of the process of the estimated speed control processing unit 340 will be described later.

Based on the estimated speed generated by the estimated speed control processing unit 340, the control amount generation processing unit 350 generates a control amount for controlling the driving force.

The processing result output unit 400 executes a process of outputting the control amount generated by the acceleration slip suppression processing unit 300 to the drive device.

Figure 3:
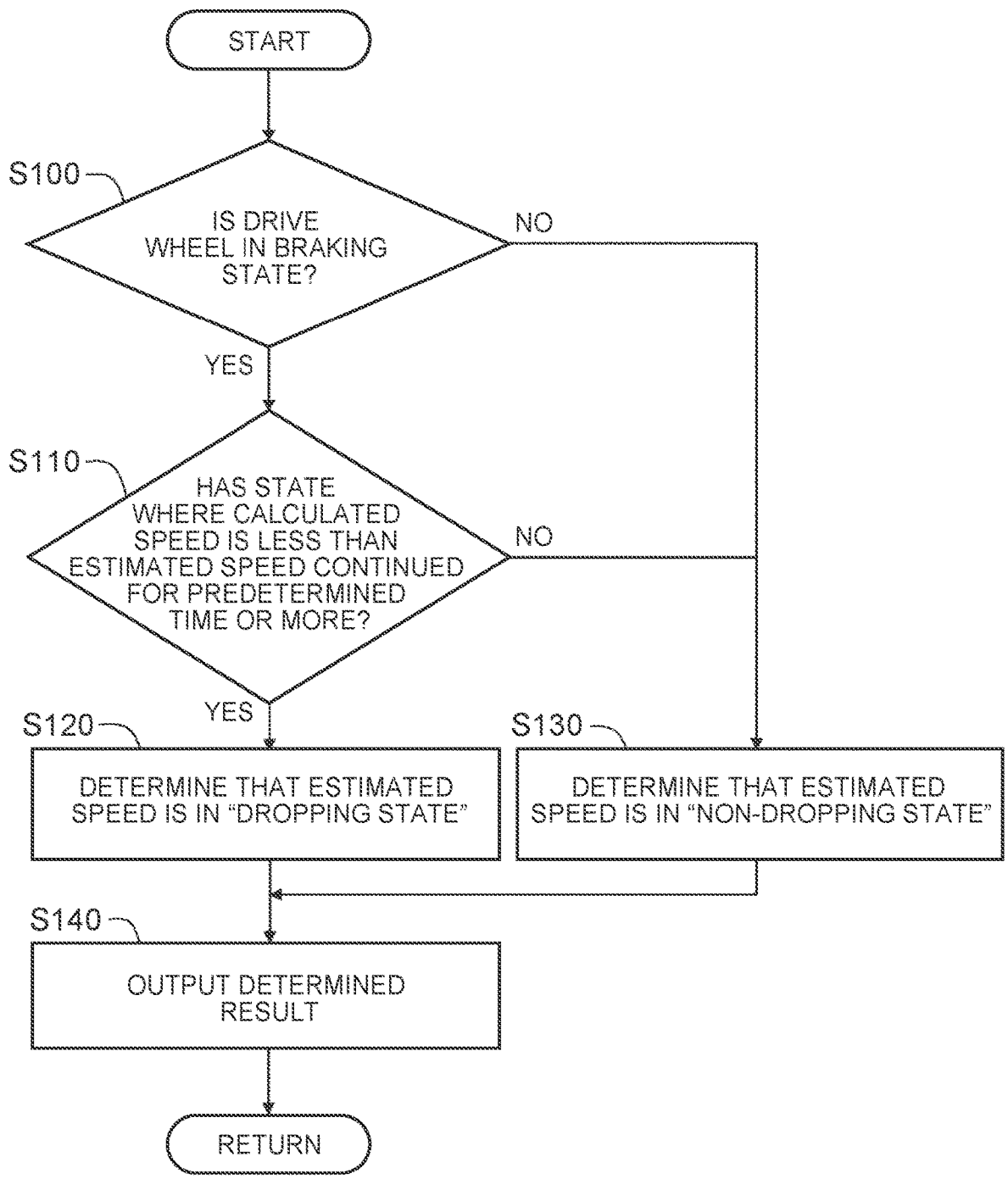
FIG. 3 is a flowchart illustrating a processing example of an estimated speed dropping determination unit in an acceleration slip suppression processing unit of the vehicle control device according to the embodiment of the present disclosure.

FIG. 3 is a flowchart illustrating a processing example of the estimated speed dropping determination unit 320.

At step S100, the estimated speed dropping determination unit 320 determines whether or not the drive wheels are in a braking state.

When it is determined that the drive wheels are in the braking state (step S100; YES), the processing proceeds to step S110. Otherwise (step S100; NO), the processing proceeds to step S130.

At step S110, the estimated speed dropping determination unit 320 determines whether or not a state where a calculated speed is less than an estimated speed has continued for a predetermined time or more.

When it is determined that the state where the calculated speed is less than the estimated speed has continued for the predetermined time or more (step S110; YES), the processing proceeds to step S120. Otherwise (step S110; NO), the processing proceeds to step S130.

At step S120, the estimated speed dropping determination unit 320 determines that the estimated speed is in a "dropping state".

At step S130, the estimated speed dropping determination unit 320 determines that the estimated speed is in a "non-dropping state".

At step S140, the estimated speed dropping determination unit 320 outputs the determined result.

Figure 4:
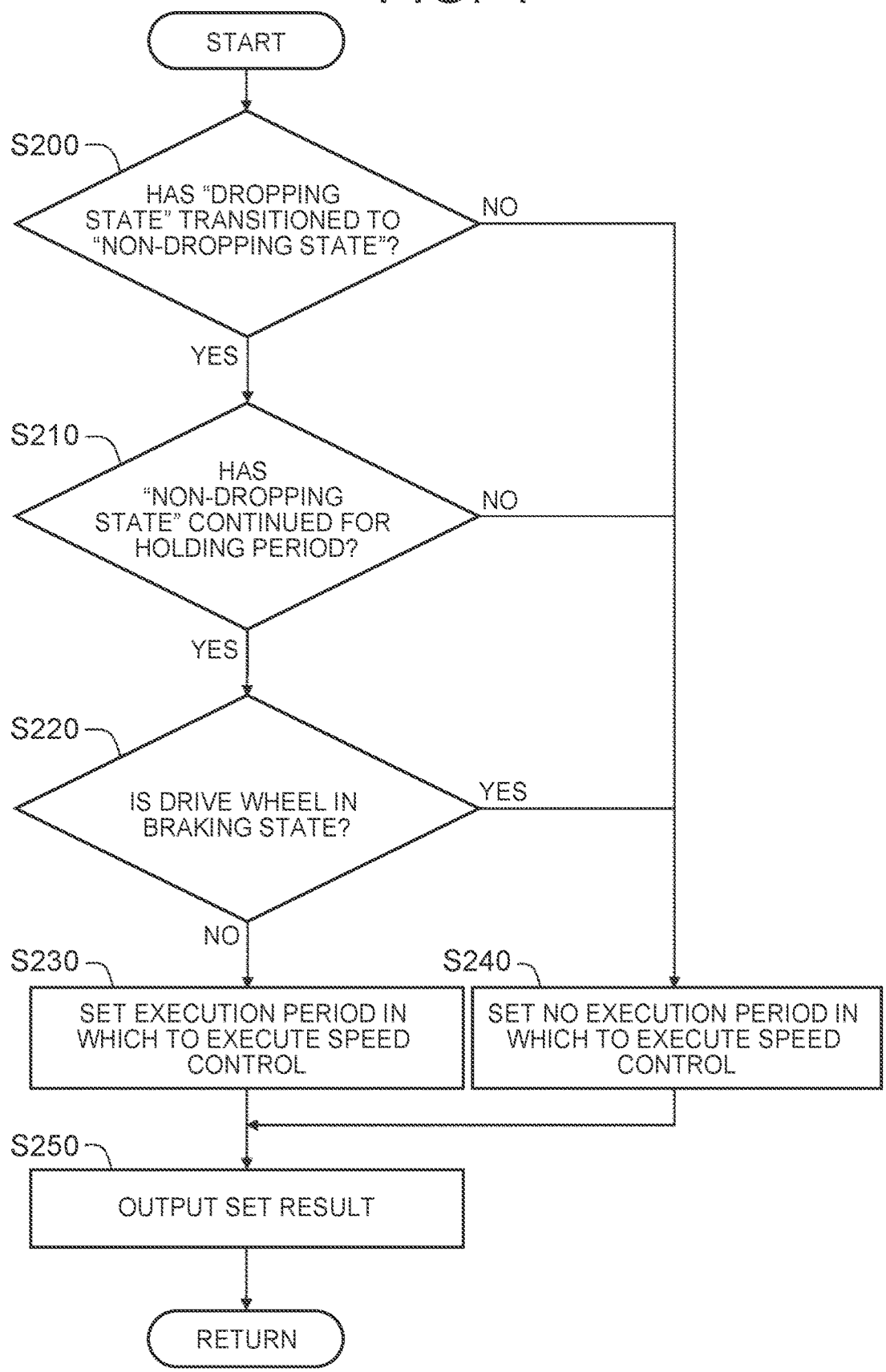
FIG. 4 is a flowchart illustrating a processing example of a speed control period setting processing unit in the acceleration slip suppression processing unit of the vehicle control device according to the embodiment of the present disclosure.

FIG. 4 is a flowchart illustrating a processing example of the speed control period setting processing unit 330.

At step S200, the speed control period setting processing unit 330 determines whether or not the estimated speed has transitioned from the "dropping state", as determined by the estimated speed dropping determination unit 320, to the "non-dropping state".

When it is determined that the estimated speed has transitioned from the "dropping state" to the "non-dropping state" (step S200; YES), the processing proceeds to step S210. Otherwise (step S200; NO), the processing proceeds to step S240.

At step S210, the speed control period setting processing unit 330 determines whether or not the "non-dropping state" has continued for a holding period after the estimated speed has transitioned to the "non-dropping state".

When it is determined that the "non-dropping state" of the estimated speed has continued for the holding period (step S210; YES), the processing proceeds to step S220. Otherwise (step S210; NO), the processing proceeds to step S240.

At step S220, the speed control period setting processing unit 330 determines whether or not the drive wheels are in a braking state.

When it is determined that the drive wheels are not in the braking state (step S220; NO), the processing proceeds to step S230. Otherwise (step S220; YES), the processing proceeds to step S240.

At step S230, the speed control period setting processing unit 330 sets, as a period following the holding period, an execution period indicative of a period in which the control of the estimated speed is executed.

At step S240, the speed control period setting processing unit 330 sets not to execute the control of the estimated speed.

At step S250, the speed control period setting processing unit 330 outputs the set result.

Figure 5:
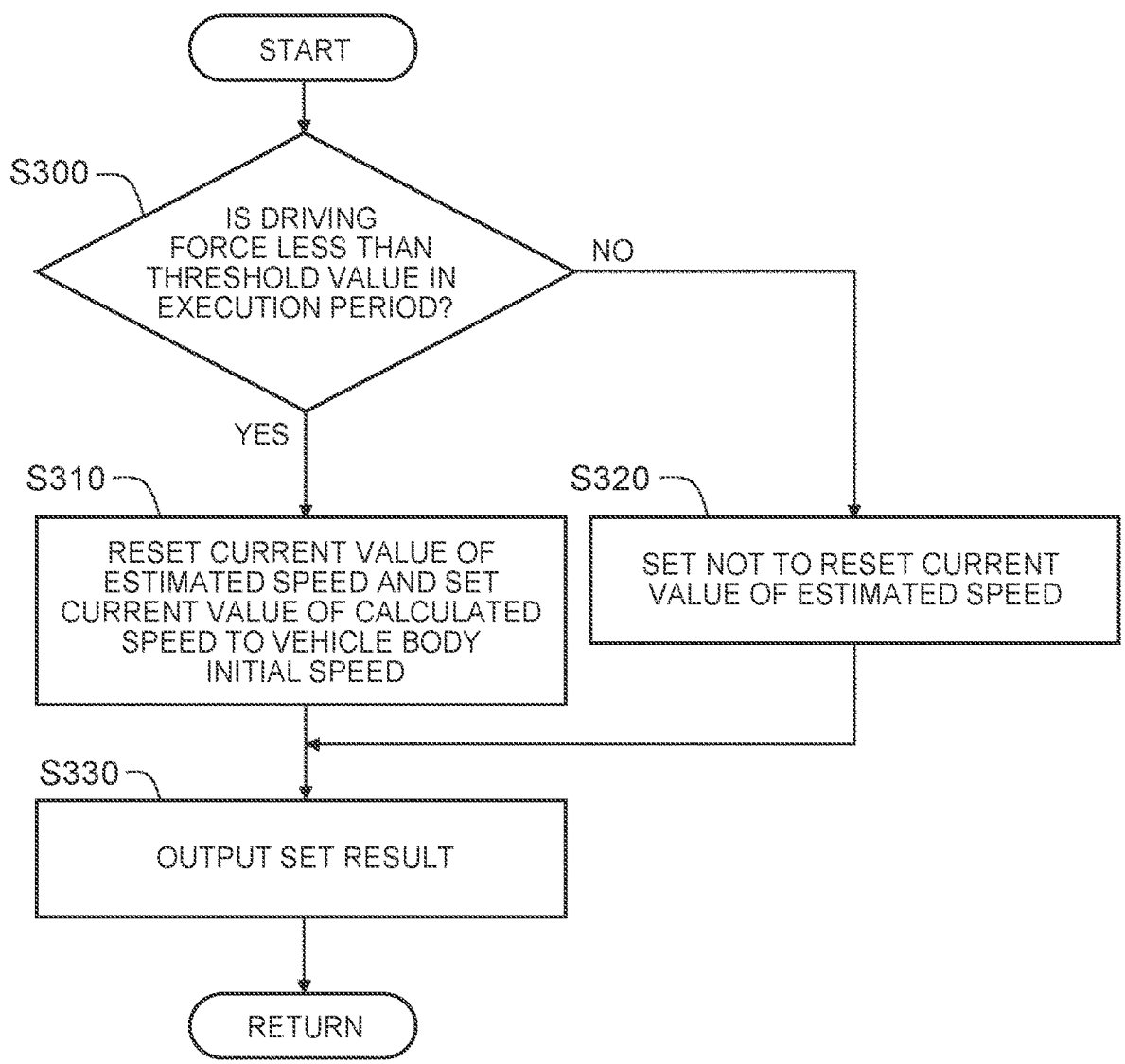
FIG. 5 is a flowchart illustrating a processing example of an estimated speed control processing unit in the acceleration slip suppression processing unit of the vehicle control device according to the embodiment of the present disclosure.

FIG. 5 is a flowchart illustrating a processing example of the estimated speed control processing unit 340.

At step S300, the estimated speed control processing unit 340 determines whether or not the driving force is less than a threshold value in the execution period set by the speed control period setting processing unit 330, in which it is possible to control the estimated speed.

When it is determined that the driving force is less than the threshold value (step S300; YES), the processing proceeds to step S310. Otherwise (step S300; NO), the processing proceeds to step S320.

At step S310, the estimated speed control processing unit 340 resets a current value of the estimated speed and sets a current value of the calculated speed to a vehicle body initial speed used for estimating the estimated speed.

At step S320, the estimated speed control processing unit 340 sets not to reset the current value of the estimated speed.

At step S330, the estimated speed control processing unit 340 outputs the set result.

Figure 6:
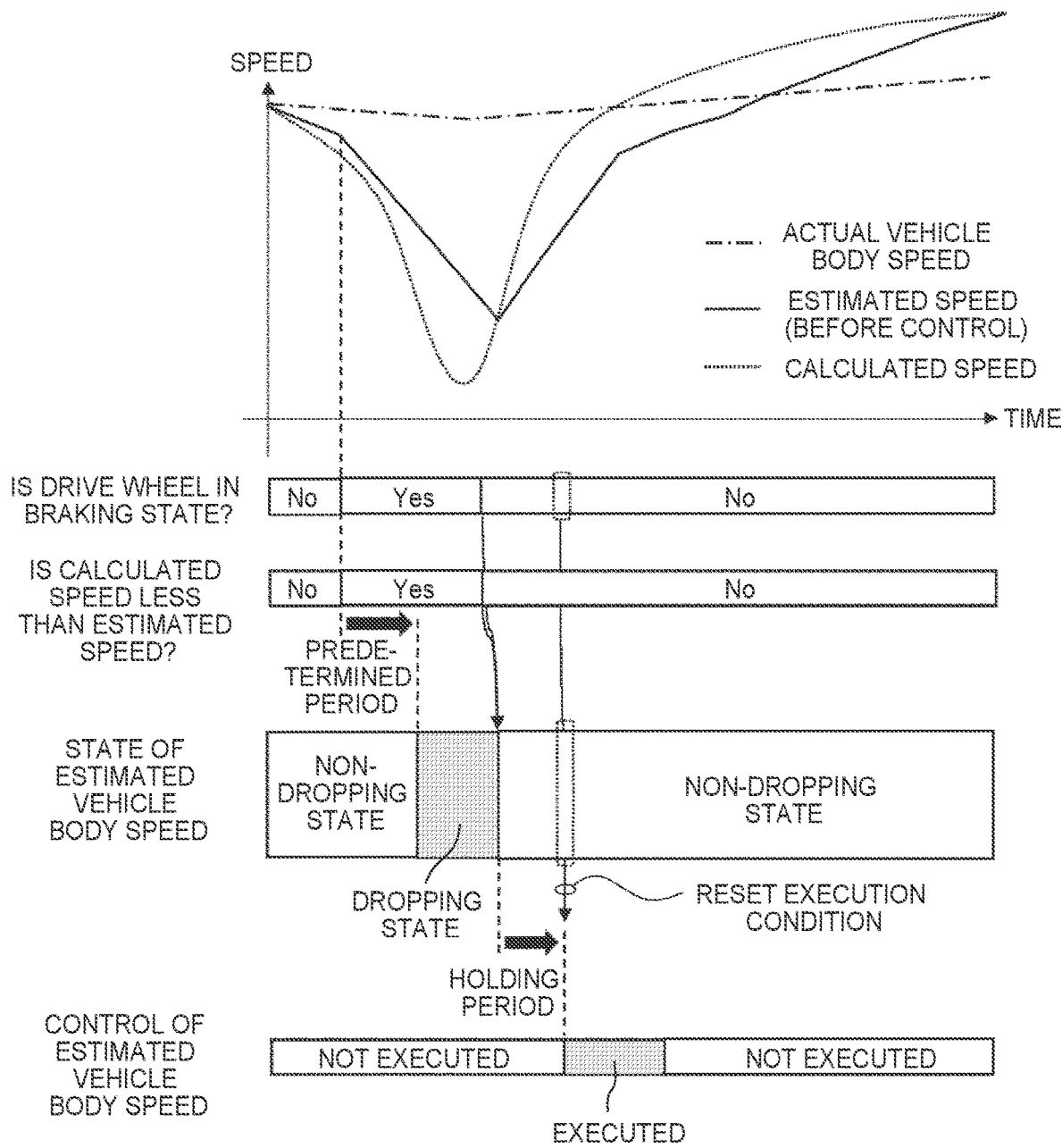
FIG. 6 is a diagram illustrating a processing example in the acceleration slip suppression processing unit of the vehicle control device according to the embodiment of the present disclosure.

FIG. 6 is a diagram illustrating a processing example of the acceleration slip suppression processing unit 300. Herein, the content of a processing example of determining the estimated speed to be in a "dropping state" in the estimated speed dropping determination unit 320 and the content of a processing example of setting an execution period in which it is possible to control the estimated speed, in the speed control period setting processing unit 330 will be described. First, the processing example of determining the estimated speed to be in the "dropping state" in the estimated speed dropping determination unit 320 will be described. Specifically, when the condition is satisfied where the drive wheels are in a braking state and the state in which the calculated speed is less than the estimated speed has continued for a predetermined time or more, the estimated speed is determined to be in the "dropping state". When this condition is not satisfied, the estimated speed is determined to be in a "non-dropping state".

Subsequently, the processing example of setting the execution period in which it is possible to control the estimated speed, in the speed control period setting processing unit 330 will be described. Specifically, when the reset condition is satisfied where, after the estimated speed has transitioned from the "dropping state" to the "non-dropping state" and then the "non-dropping state" has continued for a holding period, the estimated speed is in the "non-dropping state" and further the drive wheels are not in a braking state, the execution period in which it is possible to control the estimated speed is set. In this execution period, the control is executed to, based on a state of driving force, reset a current value of the estimated speed and set a current value of the calculated speed to a vehicle body initial speed used for estimating the estimated speed.

FIG. 7 is a diagram illustrating an example of the processing result in the acceleration slip suppression processing unit 300. First, the relationship between the state of the estimated speed and the acceleration slip will be described. Thereafter, the manner in which the acceleration slip amount changes will be described when the estimated speed is not controlled and when the estimated speed is controlled. Specifically, when the estimated speed is less than the calculated speed after the drive wheels have transitioned from a braking state to a non-braking state, an acceleration slip state indicative of an apparent slipping state occurs. In this state, when the difference between the calculated speed and the estimated speed is small, the acceleration slip amount also becomes small. On the other hand, when the difference between the calculated speed and the estimated speed is large, the acceleration slip amount also becomes large. That is, it can be said that the difference between the calculated speed and the estimated speed is in a proportional relationship with the acceleration slip amount. Therefore, in the state before control where the estimated speed is not controlled, since the calculated speed is not set to the vehicle body initial speed of the estimated speed, the difference between the calculated speed and the estimated speed becomes large so that the acceleration slip amount also becomes large. On the other hand, in the state after control where the estimated speed is controlled, since the calculated speed is set to the vehicle body initial speed of the estimated speed, the difference between the calculated speed and the estimated speed becomes small so that the acceleration slip amount also becomes small.

FIG. 8 is a diagram illustrating an example of the processing result in the acceleration slip suppression processing unit 300. With reference to FIG. 7, it has been described that the acceleration slip amount can be made small by controlling the estimated speed. Herein, an example will be given of a suppression method that further reduces the acceleration slip amount in the state after control where the estimated speed is controlled. Specifically, an estimated speed estimated based on the result of the estimated speed control processing unit 340 is multiplied by a gain. Consequently, compared to the state of the estimated speed before being multiplied by the gain, the difference between the calculated speed and the estimated speed becomes smaller so that the acceleration slip amount also becomes smaller. As the gain, a predetermined value, a value obtained by adding a certain amount to an acceleration, and so forth are given by way of example.

1-3. Effects

By determining whether or not the estimated speed is in a "dropping state" or a "non-dropping state", it is possible to detect in advance an acceleration slip that occurs when the drive wheels have transitioned from a braking state to a non-braking state. Further, in the acceleration slip state, by setting an execution period in which it is possible to control the estimated speed, and by monitoring a state of driving force to the drive wheels in the execution period, it is possible to determine whether or not it is the proper timing to suppress the acceleration slip amount. Further, based on the state of the driving force, a current value of the estimated speed is reset and a current value of the calculated speed is set to a vehicle body initial speed used for estimating the estimated speed, so that it is possible to set the estimated speed to a proper speed. Consequently, it is possible to suppress poor acceleration caused by the intervention of the TRC, and it is also possible to suppress an actual slip state where the estimated speed exceeds the actual vehicle body speed. In this way, according to the present disclosure, it is possible to properly control the acceleration slip amount when a four-wheel drive vehicle is determined to be in an acceleration slip state.

What is claimed is:

1. A vehicle control device including: a storage device storing information on acceleration from an acceleration sensor of a four-wheel drive vehicle, information on rotational speed of a drive wheel from a wheel speed sensor of the vehicle, and information on driving force to the drive wheel; and a processor configured to suppress an acceleration slip of the vehicle, wherein the suppressing of the acceleration slip comprises:
after a dropping state where a calculated speed indicative of a vehicle body speed calculated from the rotational speed is less than an estimated speed indicative of a vehicle body speed in a front-rear direction estimated from the acceleration has transitioned to a non-dropping state and a holding period in which the non-dropping state is held has passed, determining whether a reset condition to reset the estimated speed is satisfied;
when the reset condition is determined to be satisfied, determining whether the driving force is less than a threshold value; and
when the driving force is determined to be less than the threshold value, resetting the estimated speed and setting a current value of the calculated speed to a vehicle body initial speed used for estimating the estimated speed.

2. The vehicle control device according to claim 1, wherein the estimated speed obtained by setting the current value of the calculated speed to the vehicle body initial speed is further multiplied by a gain.

3. The vehicle control device according to claim 1, wherein the reset condition includes that the estimated speed is in the non-dropping state and that the drive wheel is not in a braking state.

4. The vehicle control device according to claim 1, wherein the suppressing of the acceleration slip further comprises determining the dropping state, the determining of the dropping state comprises:
determining whether the drive wheel is in a braking state and whether a state where the calculated speed is less than the estimated speed has continued for a predetermined period or more; and
when it is determined that the drive wheel is in the braking state and that the state where the calculated speed is less than the estimated speed has continued for the predetermined period or more, determining that the estimated speed is in the dropping state.

* * * * *